United States Patent
Smith et al.

(10) Patent No.: US 10,634,860 B2
(45) Date of Patent: *Apr. 28, 2020

(54) FIBER OPTIC CONNECTOR HOLDER AND METHOD

(71) Applicant: CommScope Technologies LLC, Hickory, NC (US)

(72) Inventors: Trevor D. Smith, Eden Prairie, MN (US); Thomas C. Tinucci, Chaska, MN (US); Cindy S. Walters, Prior Lake, MN (US); James W. Conroy, Prior Lake, MN (US); Joel B. Douglas, Newton, IA (US); Kathleen M. Barnes, Santa Rosa, CA (US); Marlon E. Holmquist, St. Peter, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/229,937

(22) Filed: Dec. 21, 2018

(65) Prior Publication Data

US 2019/0196120 A1 Jun. 27, 2019

Related U.S. Application Data

(63) Continuation of application No. 15/728,067, filed on Oct. 9, 2017, now Pat. No. 10,168,491, which is a
(Continued)

(51) Int. Cl.
*G02B 6/38* (2006.01)

(52) U.S. Cl.
CPC ........... *G02B 6/3897* (2013.01); *G02B 6/381* (2013.01); *G02B 6/3825* (2013.01); *G02B 6/3849* (2013.01); *Y10T 29/49826* (2015.01)

(58) Field of Classification Search
CPC .... G02B 6/3897; G02B 6/381; G02B 6/3825; G02B 6/3849; Y10T 29/49826
(Continued)

(56) References Cited

U.S. PATENT DOCUMENTS

| 4,736,100 A | 4/1988 | Vastagh |
| 4,747,020 A | 5/1988 | Brickley et al. |

(Continued)

FOREIGN PATENT DOCUMENTS

| CN | 2426610 Y | 4/2001 |
| CN | 2625920 Y | 7/2004 |

(Continued)

OTHER PUBLICATIONS 20 photographs showing what AFL Telecommunications LLC purports to be the ECOE cabinet referenced in the Prior art statement and the Supplemental prior art statement listed above. AFL Telecommunications LLC asserts the cabinet shown in the photographs was on sale as early as 2001.
(Continued)

*Primary Examiner* — Harshad C Patel
(74) *Attorney, Agent, or Firm* — Merchant & Gould P.C.

(57) ABSTRACT

A fiber optic connector holder is sized to fit within an opening for mounting a fiber optic adapter. The fiber optic connector holder is configured to permit a fiber optic connector with a dust cap positioned about a ferrule and a polished end face of an optical fiber held by the ferrule to be inserted within and releasably held by the connector holder. A system for holding fiber optic connectors includes a fiber optic connector holder mounted within an opening in a bulkhead for mounting a fiber optic adapter. The fiber optic connector holder is configured to receive a fiber optic connector with a dust cap mounted about a ferrule and polished end face of an optical fiber held by the ferrule. An
(Continued)

optical fiber connector may be held to a bulkhead when the fiber optic connector includes a dust cap mounted about a ferrule and a polished end face of an optical fiber held by the ferrule.

20 Claims, 8 Drawing Sheets

Related U.S. Application Data continuation of application No. 15/289,330, filed on Oct. 10, 2016, now Pat. No. 9,784,928, which is a continuation of application No. 14/840,986, filed on Aug. 31, 2015, now Pat. No. 9,470,851, which is a continuation of application No. 14/132,282, filed on Dec. 18, 2013, now Pat. No. 9,122,019, which is a continuation of application No. 13/540,258, filed on Jul. 2, 2012, now Pat. No. 8,636,421, which is a continuation of application No. 13/177,108, filed on Jul. 6, 2011, now Pat. No. 8,210,756, which is a continuation of application No. 12/908,271, filed on Oct. 20, 2010, now Pat. No. 7,980,768, which is a continuation of application No. 12/185,504, filed on Aug. 4, 2008, now Pat. No. 7,841,775, which is a continuation of application No. 11/729,425, filed on Mar. 27, 2007, now Pat. No. 7,407,330, which is a continuation of application No. 10/610,325, filed on Jun. 30, 2003, now Pat. No. 7,198,409.

(58) Field of Classification Search
USPC .................................................. 385/53, 153
See application file for complete search history.

(56) References Cited

U.S. PATENT DOCUMENTS

| | | |
|---|---|---|
| 4,792,203 A | 12/1988 | Nelson et al. |
| 4,824,196 A | 4/1989 | Bylander |
| 4,861,134 A | 8/1989 | Alameel et al. |
| 4,900,123 A | 2/1990 | Barlow et al. |
| 4,913,522 A | 4/1990 | Nolf et al. |
| 4,948,220 A | 8/1990 | Violo et al. |
| 4,977,483 A | 12/1990 | Perretta |
| 4,995,688 A | 2/1991 | Anton et al. |
| 4,999,652 A | 3/1991 | Chan |
| 5,023,646 A | 6/1991 | Ishida et al. |
| 5,058,983 A | 10/1991 | Corke et al. |
| 5,073,042 A | 12/1991 | Mulholland et al. |
| 5,076,688 A | 12/1991 | Bowen et al. |
| 5,142,598 A | 8/1992 | Tabone |
| 5,214,735 A | 5/1993 | Henneberger et al. |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,363,465 A | 11/1994 | Korkowski et al. |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,469,526 A | 11/1995 | Rawlings |
| 5,497,444 A | 3/1996 | Wheeler |
| 5,506,922 A | 4/1996 | Grois et al. |
| 5,511,144 A | 4/1996 | Hawkins et al. |
| 5,542,015 A | 7/1996 | Hultermans |
| 5,647,043 A | 7/1997 | Anderson et al. |
| 5,708,751 A | 1/1998 | Mattei |
| 5,734,776 A | 3/1998 | Puetz |
| 5,764,844 A | 6/1998 | Mendes |
| 5,774,612 A | 6/1998 | Belenkiy et al. |
| 5,778,130 A | 7/1998 | Walters et al. |
| 5,778,132 A | 7/1998 | Csipkes et al. |
| 5,784,515 A | 7/1998 | Tamara et al. |
| 5,823,646 A | 10/1998 | Arizpe et al. |
| 5,825,955 A | 10/1998 | Ernst et al. |
| 5,883,995 A | 3/1999 | Lu |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 5,975,769 A | 11/1999 | Larson et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,069,797 A | 5/2000 | Widmayer et al. |
| 6,076,975 A | 6/2000 | Roth |
| 6,079,881 A | 6/2000 | Roth |
| 6,096,797 A | 8/2000 | Prantl et al. |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,247,849 B1 | 6/2001 | Liu |
| 6,256,443 B1 | 7/2001 | Uruno |
| 6,259,850 B1 | 7/2001 | Crosby, Jr. et al. |
| 6,271,484 B1 | 8/2001 | Tokutsu |
| 6,278,829 B1 | 8/2001 | BuAbbud et al. |
| 6,298,190 B2 | 10/2001 | Waldron et al. |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews |
| D466,087 S | 11/2002 | Cuny et al. |
| 6,480,487 B1 | 11/2002 | Wegleirner et al. |
| 6,483,977 B2 | 11/2002 | Battey et al. |
| 6,496,640 B1 | 12/2002 | Harvey et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 | 4/2003 | Lampert |
| 6,554,485 B1 | 4/2003 | Beatty et al. |
| 6,556,763 B1 | 4/2003 | Puetz et al. |
| 6,577,595 B1 | 6/2003 | Counterman |
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| 6,654,536 B2 | 11/2003 | Battey et al. |
| 6,661,961 B1 | 12/2003 | Allen et al. |
| 6,668,127 B1 | 12/2003 | Mahony |
| 6,678,457 B2 | 1/2004 | Kim et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,768,860 B2 | 7/2004 | Liberty |

(56) References Cited

U.S. PATENT DOCUMENTS

| | | |
|---|---|---|
| 6,778,752 B2 | 8/2004 | Laporte et al. |
| 6,788,786 B1 | 9/2004 | Kessler et al. |
| 6,792,190 B2 | 9/2004 | Xin |
| 6,792,191 B1 | 9/2004 | Clapp, Jr. et al. |
| 6,815,612 B2 | 11/2004 | Bloodworth et al. |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,901,200 B2 | 5/2005 | Schray |
| 6,909,833 B2 | 6/2005 | Henschel et al. |
| 6,920,274 B2 | 7/2005 | Rapp et al. |
| 6,925,241 B2 | 8/2005 | Bohle et al. |
| 6,950,593 B2 | 9/2005 | Hodge et al. |
| 6,980,725 B1 | 12/2005 | Swieconek |
| 6,983,095 B2 | 1/2006 | Reagan et al. |
| 7,029,322 B2 | 4/2006 | Ernst et al. |
| 7,088,899 B2 | 8/2006 | Reagan et al. |
| 7,103,255 B2 | 9/2006 | Reagan et al. |
| 7,142,764 B2 | 11/2006 | Allen et al. |
| 7,146,089 B2 | 12/2006 | Reagan et al. |
| 7,166,805 B2 | 1/2007 | Robinson et al. |
| 7,171,102 B2 | 1/2007 | Reagan et al. |
| 7,198,409 B2 * | 4/2007 | Smith ............... G02B 6/3849 385/53 |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,369,741 B2 | 5/2008 | Reagan et al. |
| 7,407,330 B2 * | 8/2008 | Smith ............... G02B 6/3849 385/53 |
| 7,457,503 B2 | 11/2008 | Solheid |
| 7,471,869 B2 | 12/2008 | Reagan et al. |
| 7,515,805 B2 | 4/2009 | Smith et al. |
| 7,519,259 B2 | 4/2009 | Smith et al. |
| 7,809,233 B2 | 10/2010 | Smith et al. |
| 7,809,234 B2 | 10/2010 | Smith et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,980,768 B2 * | 7/2011 | Smith ............... G02B 6/3849 385/53 |
| 7,995,894 B2 | 8/2011 | Solheid et al. |
| 8,005,335 B2 | 8/2011 | Reagan et al. |
| 8,184,940 B2 | 5/2012 | Smith et al. |
| 8,210,756 B2 * | 7/2012 | Smith ............... G02B 6/3849 385/53 |
| 8,401,357 B2 | 3/2013 | Solheid et al. |
| 8,538,228 B2 | 9/2013 | Smith et al. |
| 8,636,421 B2 * | 1/2014 | Smith ............... G02B 6/3849 385/53 |
| 8,811,791 B2 | 8/2014 | Solheid et al. |
| 8,818,158 B2 | 8/2014 | Smith et al. |
| 8,841,775 B2 * | 9/2014 | Watanabe ........... H01L 23/522 257/774 |
| 9,122,019 B2 * | 9/2015 | Smith ............... G02B 6/3849 |
| 9,201,206 B2 | 12/2015 | Smith et al. |
| 9,250,408 B2 | 2/2016 | Solheid et al. |
| 9,304,276 B2 | 4/2016 | Solheid et al. |
| 9,341,798 B2 | 5/2016 | Smith et al. |
| 9,411,120 B2 | 8/2016 | Crain, Jr. |
| 9,470,851 B2 * | 10/2016 | Smith ............... G02B 6/3849 |
| 9,541,724 B2 | 1/2017 | Solheid et al. |
| 9,784,928 B2 * | 10/2017 | Smith ............... G02B 6/3849 |
| 10,151,896 B2 | 12/2018 | Solheid et al. |
| 10,168,491 B2 | 1/2019 | Smith et al. |
| 2001/0001270 A1 | 5/2001 | Williams Vigliaturo |
| 2002/0034290 A1 | 3/2002 | Pershan |
| 2002/0176681 A1 | 11/2002 | Puetz et al. |
| 2002/0181893 A1 | 12/2002 | White et al. |
| 2003/0002812 A1 | 1/2003 | Lampert |
| 2003/0113086 A1 | 6/2003 | Jun et al. |
| 2003/0174996 A1 | 9/2003 | Henschel et al. |
| 2003/0207601 A1 | 11/2003 | Adachi |
| 2004/0074852 A1 | 4/2004 | Knudsen et al. |
| 2004/0126069 A1 | 7/2004 | Jong et al. |
| 2004/0165852 A1 | 8/2004 | Erwin et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0129379 A1 | 6/2005 | Reagan et al. |
| 2005/0163448 A1 | 7/2005 | Blackwell, Jr. et al. |
| 2005/0281526 A1 | 12/2005 | Vongseng et al. |
| 2006/0083475 A1 | 4/2006 | Grubish et al. |
| 2006/0115220 A1 | 6/2006 | Elkins, II et al. |
| 2006/0204200 A1 | 9/2006 | Lampert et al. |
| 2008/0019644 A1 | 1/2008 | Smith et al. |
| 2008/0019655 A1 | 1/2008 | Vongseng et al. |
| 2008/0025684 A1 | 1/2008 | Vongseng et al. |
| 2008/0075411 A1 | 3/2008 | Solheid et al. |
| 2008/0317425 A1 | 12/2008 | Smith et al. |
| 2009/0074372 A1 | 3/2009 | Solheid et al. |
| 2009/0087157 A1 | 4/2009 | Smith et al. |
| 2009/0190896 A1 | 7/2009 | Smith et al. |
| 2009/0196565 A1 | 8/2009 | Vongseng et al. |
| 2009/0285540 A1 | 11/2009 | Reagan et al. |
| 2009/0317047 A1 | 12/2009 | Smith et al. |
| 2010/0226615 A1 | 9/2010 | Reagan et al. |
| 2012/0301090 A1 | 11/2012 | Cline et al. |
| 2018/0267261 A1 | 9/2018 | Smith et al. |
| 2018/0372972 A1 | 12/2018 | Solheid et al. |
| 2018/0372973 A1 | 12/2018 | Solheid et al. |

FOREIGN PATENT DOCUMENTS

| | | |
|---|---|---|
| EP | 0 743 701 A2 | 11/1996 |
| EP | 0 788 002 A1 | 8/1997 |
| EP | 0 871 047 A1 | 10/1998 |
| EP | 0 967 498 A1 | 12/1999 |
| EP | 0 975 180 A1 | 1/2000 |
| EP | 1 045 267 A1 | 10/2000 |
| JP | 63-229409 | 9/1988 |
| JP | 2000-75180 | 3/2000 |
| JP | 2000-193833 A | 7/2000 |
| JP | 2000-241629 | 9/2000 |
| JP | 2001-13365 | 1/2001 |
| JP | 2001-27720 | 1/2001 |
| JP | 2001-133634 | 5/2001 |
| JP | 2001-235633 | 8/2001 |
| JP | 1144266 S | 6/2002 |
| JP | 3307618 B2 | 7/2002 |
| JP | 2002-243981 | 8/2002 |
| JP | 2002-258898 | 9/2002 |
| JP | 2003-255186 | 9/2003 |
| JP | 2005-91379 | 4/2005 |
| JP | 3698579 B2 | 9/2005 |
| JP | 3761762 B2 | 3/2006 |
| JP | 2007-121609 | 5/2007 |
| WO | WO 98/53347 | 11/1998 |
| WO | WO 99/27404 | 6/1999 |
| WO | WO 00/75706 A2 | 12/2000 |
| WO | WO 02/21182 A1 | 3/2002 |
| WO | WO 02/103429 A2 | 12/2002 |
| WO | WO 04/032532 A2 | 4/2004 |

OTHER PUBLICATIONS 24 photos of LambdaUnite® Blank Card; "LambdaUnite® MultiService Switch (MSS)" brochure (2003); and "Lucent's LambdaUnite® Busts Out" official release (Jan. 29, 2002).

ADC Telecommunications, Inc.'s 2$^{nd}$ Edition of Fiber Panel Products; front cover, Table of Contents, pp. 1-111, and back cover; revised Jul. 1, 1996, Item No. 846.

ADC Telecommunications, Inc.'s 6th Edition of Next Generation Frame (NGF) Product Family Ordering Guide; front cover, Table of Contents, pp. 1-41, and back cover; revised Feb. 2003, Item No. 820.

ADC Telecommunications, Inc.'s Fiber Optic, Cable Assemblies and Accessories Brochure; front cover, Table of Contents, pp. 1-23, and back cover; revised Apr. 2003, Item No. 100300.

(56) References Cited

OTHER PUBLICATIONS

ADC Telecommunications, Inc.'s OMX™ 600, Optical Distribution Frame Brochure; front cover, Table of Contents, pp. 1-14, and back cover; revised Feb. 2001, Item No. 854.
ADC Telecommunications, Inc.'s Outside Plant, Fiber Cross-Connect Solutions Products Brochure; front cover, Table of Contents, pp. 1-48, and back cover; revised Jun. 2002, Item No. 1047.
ADC Telecommunications, Inc.'s Secure Fiber Entrance Terminal (SFET) Brochure; front cover, pp. 2-7, and back cover; revised May 1998, Item No. 1005.
ADC Telecommunications, Inc., brochure titled *Value Added Module System*, © 2000 (29 pages).
ADC Telecommunications, Inc., brochure titled *Value-Added Module System: Optical Distribution Frame (OMX™ 600)*, ° 2001 (11 pages).
Amendment including current listing of the claims filed Jun. 13, 2008 for U.S. Appl. No 11/835,858, filed Aug. 8, 2007, now published as U.S. Publication No. 2008/0025684.
AMP Inc. catalog entitled "Fiber Optic Products," front and back covers and p. 59, (4 pgs.) (© 1991).
Assembly reference drawings having drawing No. 1067101, dated Aug. 17, 1999.
AT&T Network Systems catalog entitled "Fiber Optic Products Innovation for wide ranging applications," front and back covers and pp. 6-1 through 6-16 (18 pages) (© 1995).
ATI Optique Catalog, ATI Optique Division of TI electronique, Version 2.6, released Mar. 27, 2002 (50 pages).
Brochure from Amphenol Corp. entitled "Amphenol® 954 Series one piece SC Connector," 2 pgs. (1990).
Certified English Translation of JP2000-193833 by David Baldwin of Park IP Translations (26 pages).
Certified English Translation of JP2000-193833 by Frank McGee of Morningside IP (24 pages).
Certified English Translation of JP2000-241629 by Frank McGee of Morningside IP (33 pages).
Certified English Translation of JP2000-241629 by Jonathan Merz (36 pages).
Connectorized splitter drawings having drawing No. 1067961, dated Aug. 18, 1999.
*Couplers: Couplers WDMS Packaging*, Alcoa Fujikura Ltd., Telecommunications Division, © 2000 (5 pages) showing AFL splitters.
Drawings showing an ADC fiber storage trough concept including presentation entitled "Fujitsu Fiber Management Project Fiber Trough Concept", 11 pages (Jun. 2002).
Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).
European Search Report dated Nov. 19, 2009 for European Application No. 09011819, which claims priority to previously cited U.S. Pat. No. 7,198,409 (7 pages).
European Search Report for Application No. 10158615.4 dated Jun. 9, 2010.
European Search Report and written opinion cited in Application No. 10158615.4 dated Oct. 4, 2010.
European Search Report and written opinion cited in Application No. 10183098.2 dated Dec. 14, 2010 (7 pages).
European Search Report for Application No. 11166490.0 dated Jul. 4, 2011.
European Search Report dated Sep. 5, 2011 (7 pages).
Fiber distribution drawings having drawing No. 1069967, dated Aug. 17, 1999.
Final Office Action dated Dec. 10, 2009 in copending U.S. Appl. No. 12/194,328 (published as US 2008/0317425), which claims priority to U.S. Pat. No. 7,218,827 to which the present application also claims priority.

FONS Corporation's MDC Series Rack or Wall Mount Enclosures product sheet, 3 pages, (2002).
FONS Corporation's Modular Distribution Cabinets Rack Mount Enclosures, Model MDC-7, product sheet, 2 pages (2005) (shows the same device as shown in FONS Corporation's MDC Series Rack or Wall Mount Enclosures product sheet (above)).
FONS Corporation's Technical Drawing No. 11669, Rev. D, of Distribution Cabinet Assembly MFDC-7, 1 page (technical drawing depicting the device shown in FONS Corporation's Modular Distribution Cabinets Rack Mount Enclosures (above)).
Fourth Preliminary Amendment including current listing of the claims filed with U.S. Appl. No. 11/835,882, filed Aug. 8, 2007, now published as U.S. Publication No. 2008/0019655.
Hasegawa et al., *100GHz-48CH Athermal AWG with a Novel Temperature Insensitive Principle*, National Fiber Optics Engineers Conference, 2003 Technical Proceedings, pp. 801-808.
Hecht, J., "Connectors," *Understanding Fiber Optics*, Chapter 13, Third Edition, pp. 251-265 (Copyright 1999).
HRS catalog entitled "Optical Fibre Connectors," front and back covers and pp. 16, 17 and 49 (5 pages) (Mar. 1991).
Installation drawings having drawing No. 1069965, dated Aug. 14, 1999.
Iwano, S. et al., "MU-type Optical Fiber Connector System," *NTT Review*, vol. 9, No. 2, pp. 63-71 (Mar. 1997).
LC Extraposition Dust Cap, Zhejiang Yingfeng Optical Communication Technology, http://www.nhyingfeng.com/en/show.asp?id=438, 5 pages (Copyright 2016).
LC Molded Connector Dust Cap—100 Pack, Cables Plus USA, https://store.cablesplususa.com/lcmocoducap1.html, 2 pages (Copyright 2003-2018).
Mini-SAS Cables, Vandesail 0.5m Internal Mini-SAS to 4x: Amazon. co.uk Electronics, https://www.amazon.co.uk/Mini-SAS-VANDESAIL-Internal-SAS-Breakout-Cable/dp/B01HZFUNVS, 7 pages (2017).
Nexans, Cross-Connect Cabinet III: Plastic Watertight Cabinet for FTTH Applications, dated 2002 (2 pages).
Nexans, Cross-Connect Cabinet V: Metallic Watertight Cabinet for FTTH Applications, dated 2002 (2 pages).
Notice of Allowance for U.S. Appl. No. 11/835,858, filed Aug. 8, 2007, now published as U.S. Publication No. 2008/0025684 A1.
Notice of Allowance for U.S. Appl. No. 11/835,882, filed Aug. 8, 2007, now published as U.S. Publication No. 2008/0019655 A1.
Notice of Allowance dated Apr. 8, 2010 in copending U.S. Appl. No. 12/417,086 (published as US 2009-0196565), which claims priority to U.S. Pat. No. 7,218,827 to which the present application also claims priority, and allowed claims.
Notice of Allowance dated May 3, 2010 in copending U.S. Appl. No. 12/276,886, now published as U.S. Publication No. 2009/0074372.
NTT Int'l Fiber Termination Module (FTM) & Premises Optical Distribution Cabinets (PODC) product brochure, 3 pages, undated.
Office Action and Certified translation thereof cited by Japanese Patent Examiner in Japanese application No. 2006-517505, which is equivalent to copending and coassigned U.S. Appl. No. 12/276,886, filed Nov. 24, 2008, by Solheid et al., titled "Telecommunications Connection Cabinet."
Office Action dated Nov. 25, 2008 in U.S. Appl. No. 12/194,328, filed Aug. 19, 2008, now published as U.S. Publication No. 2008/0317425 A1.
Office Action dated Aug. 24, 2009 in copending U.S. Appl. No. 12/194,328, filed Aug. 19, 2008, to which the pending application claims priority.
Office Action dated Aug. 20, 2009 in copending U.S. Appl. No. 12/417,086, filed Apr. 2, 2009, which claims priority to U.S. Appl. No. 11/835,882, to which the pending application claims priority.
Office Action dated Jan. 25, 2010 in copending U.S. Appl. No. 12/392,575, published as US 2009/0190896 (previously cited).
Optical fiber coupler review, Technical Report 2001, showing Sumitomo Osaka Cement Co. Ltd's Optical Coupler (pp. 41-42).
"Retainer Staright [sic] Removable SC," which shows a latch design, 2 pages (Jan. 17, 2006).
"Senko Advanced Components: SC Connector Kits," printout from website of Senko Advanced Components at www.senko.com/

(56) References Cited

OTHER PUBLICATIONS fiberoptic/detail_product.php?product=80 available at least as early as Mar. 26, 2003 (obtained Nov. 7, 2017 via Internet Archive Wayback Machine).
Sugita, E. et al., "SC-Type Single-Mode Optical Fiber Connectors," *Journal of Lightwave Technology*, vol. 7, No. 11, pp. 1689-1696 (Nov. 1989).
Tachikura et al., *Newly Developed Optical Fiber Distribution System and Cable Management in Central Office*, International Wire & Cable Symposium, Proceedings of the 50th IWCS, pp. 98-105.
Technical Specifications, Seiko Instruments Inc., SSC-PE Series Single-Mode SC Connector Plug: (published in 2000).
U.S. Appl. No. 11/729,310, filed Mar. 27, 2007 including Fourth Preliminary Amendment filed Apr. 28, 2008.
U.S. Appl. No. 11/729,310, filed Mar. 27, 2007 including Fifth Preliminary Amendment filed Jun. 17, 2008 and Notice of Allowance (56 pages).
Complaint relating to Civil Action No. 08-CV-5222-RMK-JJK, filed Sep. 19, 2008 (8 pages).
First Amended Complaint relating to *ADC Telecommunications, Inc.* v. *Tyco Electronics Corp.*, Civil Action No. 08-CV-05222, filed Dec. 8, 2008.
Answer, Affirmative Defenses, and Counter Claims to the First Amended Complaint relating to *ADC Telecommunications, Inc.* v. *Tyco Electronics Corp.*, Civil Action No. 08-CV-05222, filed Mar. 13, 2009.
ADC's Reply to Counterclaims and Counterclaims relating to *ADC Telecommunications, Inc.* v. *Tyco Electronics Corp.*, Civil Action No. 08-CV-05222, filed Apr. 2, 2009.
Stipulated Dismissal of all Claims and Counterclaims relating to *ADC Telecommunications, Inc.* v. *Tyco Electronics Corp.*, Civil Action No. 08-CV-05222, filed Oct. 30, 2009.
Complaint relating to Civil Action No. 08-CV-02234-DWF-JSM, filed Jun. 13, 2008.
First Amended Complaint, *ADC Telecommunication, Inc. and Fiber Optic Network Solutions Corp.* v. *AFL Telecommunications LLC*, Civil Action No. 0:08-cv-02234-DWF-JSM, 8 pages (Aug. 14, 2008).
Defendant's Answer and Defenses in Response to the First Amended Complaint, *ADC Telecommunication, Inc. and Fiber Optic Network Solutions Corp.* v. *AFL Telecommunications LLC*, Civil Action No. 0:08-cv-02234-DWF-JSM, 14 pages (Dec. 8, 2008).
Amended Order for Pretrial Conference, *ADC Telecommunication, Inc. and Fiber Optic Network Solutions Corp.* v. *AFL Telecommunications LLC*, Civil Action No. 0:08-cv-02234-DWF-JSM, 5 pages (Dec. 11, 2008).
Prior art statement submitted by AFL Telecommunications LLC in Civil Action No. 08-CV-02234-DWF-JSM on May 11, 2009 (145 pages).
Supplemental prior art statement submitted by AFL Telecommunications LLC in Civil Action No. 08-CV-02234-DWF-JSM on May 19, 2009 (155 pages).
Response to prior art statement submitted by ADC Telecommunications, Inc. in Civil Action No. 08-CV-02234-DWF-JSM on Aug. 18, 2009 (131 pages).
Second supplemental prior art statement submitted by AFL Telecommunications LLC in Civil Action No. 08-CV-02234-DWF-JSM on Nov. 10, 2009 (8 pages).
Joint Claim Construction Statement, relating to Civil Action No. 08-CV-02234, filed Nov. 17, 2009 (40 pages).
Plaintiff ADC's Markman Brief (Redacted Version), filed Feb. 9, 2010, relating to Civil Action No. 08-CV-02234-DWF-JSM (99 pages).
Defendant AFL Telecommunications LLC's Memorandum in Support of Proposed Claim Construction, (AFL's Markman Brief), filed Feb. 9, 2010, relating to Civil Action No. 08-CV-02234 (42 pages).
Plaintiff ADC's Responsive Markman Brief, filed Mar. 9, 2010, relating to Civil Action No. 08-CV-02234 (21 pages).
Defendant AFL Telecommunications LLC's Answering Claim Construction Brief, filed Mar. 9, 2010, relating to *ADC Telecommunications, Inc.* v. *AFL Telecommunications LLC*, Civil Action No. 08-CV-02234 (60).
Stipulated Dismissal of all Claims and Counterclaims relating to *ADC Telecommunications, Inc.* v. *AFL Telecommunications LLC*, Civil Action No. 08-CV-02234, filed Jul. 27, 2010 (2 pages).
Dismissal Order relating to *ADC Telecommunications, Inc.* v. *AFL Telecommunications LLC*, Civil Action No. 08-CV-02234, filed Jul. 28, 2010 (1 page).
Order for Dismissal with Prejudice, *ADC Telecommunication, Inc. and Fiber Optic Network Solutions Corp.* v. *AFL Telecommunications LLC*, Civil Action No. 0:08-cv-02234-DWF-JSM, 1 page (Aug. 6, 2010).
Complaint—*CommScope Technologies LLC* v. *Clearfield, Inc.*, Case No. 17-cv-00307 (D. Minn., Jan. 2017).
Exhibit A to Complaint—*CommScope Technologies LLC* v. *Clearfield, Inc.*, Case No. 17-cv-00307 (D. Minn., Jan. 2017).
Exhibit B to Complaint—*CommScope Technologies LLC* v. *Clearfield, Inc.*, Case No. 17-cv-00307 (D. Minn., Jan. 31, 2017).
Exhibit C to Complaint—*CommScope Technologies LLC* v. *Clearfield, Inc.*, Case No. 17-cv-00307 (D. Minn., Jan. 31, 2017).
Exhibit D to Complaint—*CommScope Technologies LLC* v. *Clearfield, Inc.*, Case No. 17-cv-00307 (D. Minn., Jan. 31, 2017).
Exhibit E to Complaint—*CommScope Technologies LLC* v. *Clearfield, Inc.*, Case No. 17-cv-00307 (D. Minn., Jan. 31, 2017).
Answer to Complaint—*CommScope Technologies LLC* v. *Clearfield, Inc.*, Case No. 17-cv-00307 (D. Minn., Apr. 24, 2017).
Initial Claim Charts—*CommScope Technologies LLC* v. *Clearfield, Inc.*, Case No. 17-cv-00307 (D. Minn., Jul. 31, 2017).
Plaintiff's Response to First Set of Interrogatories (Nos. 1-15)—*CommScope Technologies LLC* v. *Clearfield, Inc.*, Case No. 17-cv-00307 (D. Minn., Sep. 14, 2017).
Plaintiff's Supplemental Response to Interrogatory No. 2—*CommScope Technologies LLC* v. *Clearfield, Inc.*, Case No. 17-cv-00307 (D. Minn., Sep. 22, 2017).
Preliminary Invalidity Claim Charts and Disclosures—*CommScope Technologies LLC* v. *Clearfield, Inc.*, Case. No. 17-cv-00307 (D. Minn., Oct. 6, 2017).
Exhibit 1 to Preliminary Invalidity Claim Charts and Disclosures—*CommScope Technologies LLC* v. *Clearfield, Inc.*, Case No. 17-cv-00307 (D. Minn., Oct. 6, 2017).
Exhibit 2 to Preliminary Invalidity Claim Charts and Disclosures—*CommScope Technologies LLC* v. *Clearfield, Inc.*, Case No. 17-cv-00307 (D. Minn., Oct. 6, 2017).
Exhibit 3 to Preliminary Invalidity Claim Charts and Disclosures—*CommScope Technologies LLC* v. *Clearfield, Inc.*, Case No. 17-cv-00307 (D. Minn., Oct. 6, 2017).
Exhibit 4 to Preliminary Invalidity Claim Charts and Disclosures—*CommScope Technologies LLC* v. *Clearfield, Inc.*, Case No. 17-cv-00307 (D. Minn., Oct. 6, 2017).
Exhibit 5 to Preliminary Invalidity Claim Charts and Disclosures—*CommScope Technologies LLC* v. *Clearfield, Inc.*, Case No. 17-cv-00307 (D. Minn., Oct. 6, 2017).
Exhibit 6 to Preliminary Invalidity Claim Charts and Disclosures—*CommScope Technologies LLC* v. *Clearfield, Inc.*, Case No. 17-cv-00307 (D. Minn., Oct. 6, 2017).
Plaintiff's Memorandum in Support of Motion to Compel—*CommScope Technologies LLC* v. *Clearfield, Inc.*, Case No. 17-cv-00307 (D. Minn., Oct. 9, 2017).
Defendant Clearfield Inc.'s Revised Preliminary Invalidity Claim Charts and Disclosures, Civil Action No. 17-cv-00307-PJS-BRT, 51 pages (Dec. 11, 2017).
Exhibit 1 to Revised Preliminary Invalidity Claim Charts and Disclosures, Civil Action No. 17-cv-00307-PJS-BRT, 42 pages (Dec. 11, 2017).
Exhibit 2 to Revised Preliminary Invalidity Claim Charts and Disclosures, Civil Action No. 17-cv-00307-PJS-BRT, 50 pages (Dec. 11, 2017).
Exhibit 3 to Revised Preliminary Invalidity Claim Charts and Disclosures, Civil Action No. 17-cv-00307-PJS-BRT, 32 pages (Dec. 11, 2017).

(56) References Cited

OTHER PUBLICATIONS

Exhibit 4 to Revised Preliminary Invalidity Claim Charts and Disclosures, Civil Action No. 17-cv-00307-PJS-BRT, 42 pages (Dec. 11, 2017).
Exhibit 5 to Revised Preliminary Invalidity Claim Charts and Disclosures, Civil Action No. 17-cv-00307-PJS-BRT, 69 pages (Dec. 11, 2017).
Exhibit 6 to Revised Preliminary Invalidity Claim Charts and Disclosures, Civil Action No. 17-cv-00307-PJS-BRT, 59 pages (Dec. 11, 2017).
Table A to Revised Preliminary Invalidity Claim Charts and Disclosures, Civil Action No. 17-cv-00307-PJS-BRT, 59 pages (Dec. 11, 2017).
Defendant Clearfield Inc.'s Second Revised Preliminary Invalidity Claim Charts and Disclosures, Civil Action No. 17-cv-00307-PJS-BRT, 65 pages (Jan. 12, 2018).
Exhibit 1 to Second Revised Preliminary Invalidity Claim Charts and Disclosures, Civil Action No. 17-cv-00307-PJS-BRT, 61 pages (Jan. 12, 2018).
Exhibit 2 to Second Revised Preliminary Invalidity Claim Charts and Disclosures, Civil Action No. 17-cv-00307-PJS-BRT, 65 pages (Jan. 12, 2018).
Exhibit 3 to Second Revised Preliminary Invalidity Claim Charts and Disclosures, Civil Action No. 17-cv-00307-PJS-BRT, 50 pages (Jan. 12, 2018).
Exhibit 4 to Second Revised Preliminary Invalidity Claim Charts and Disclosures, Civil Action No. 17-cv-00307-PJS-BRT, 60 pages (Jan. 12, 2018).
Exhibit 5 to Second Revised Preliminary Invalidity Claim Charts and Disclosures, Civil Action No. 17-cv-00307-PJS-BRT, 86 pages (Jan. 12, 2018).
Exhibit 6 to Second Revised Preliminary Invalidity Claim Charts and Disclosures, Civil Action No. 17-cv-00307-PJS-BRT, 79 pages (Jan. 12, 2018).
Commscope's Response to Clearfield's Second Revised Invalidity Claim Charts and Disclosure, Civil Action No. 17-cv-00307-PSJ-BRT, 105 pages (Jan. 19, 2018).
Exhibit A to Response to Second Revised Preliminary Invalidity Claim Charts and Disclosures, Civil Action No. 17-cv-00307-PJS-BRT, 37 pages (Jan. 19, 2018).
Exhibit B to Response to Second Revised Preliminary Invalidity Claim Charts Disclosures, Civil Action No. 17-cv-00307-PJS-BRT, 31 pages (Jan. 19, 2018).
Exhibit C to Response to Second Revised Preliminary Invalidity Claim Charts and Disclosures, Civil Action No. 17-cv-00307-PJS-BRT, 37 pages (Jan. 19, 2018).
Exhibit D to Response to Second Revised Preliminary Invalidity Claim Charts and Disclosures, Civil Action No. 17-cv-00307-PJS-BRT, 36 pages (Jan. 19, 2018).
Exhibit E to Response to Second Revised Preliminary Invalidity Claim Charts and Disclosures, Civil Action No. 17-cv-00307-PJS-BRT, 38 pages (Jan. 19, 2018).
Exhibit F to Response to Second Revised Preliminary Invalidity Claim Charts and Disclosures, Civil Action No. 17-cv-00307-PJS-BRT, 46 pages (Jan. 19, 2018).
Joint Status Report, *CommScope Technologies LLC v. Clearfield, Inc.*, Case No. 0:17-cv-00307-PJS-BRT, 11 pages (Feb. 9, 2018).
Joint Status Report Exhibit A, *CommScope Technologies LLC v. Clearfield, Inc.*, Case No. 0:17-cv-00307-PJS-BRT, 33 pages (Feb. 9, 2018).
Joint Status Report Exhibit B,*CommScope Technologies LLC v. Clearfield, Inc.*, Case No. 0:17-cv-00307-PJS-BRT, 21 pages (Feb. 9, 2018).
Stipulation of Dismissal, *CommScope Technologies LLC v. Clearfield, Inc.*, Case No. 0:17-cv-00307-PJS-BRT, 2 pages (Feb. 19, 2018).
Order of Dismissal, *CommScope Technologies LLC v. Clearfield, Inc.*, Case No. 0:17-cv-00307-PJS-BRT, 1 page (Feb. 20, 2018).
Petition for Inter Partes Review of U.S. Pat. No. 7,198,409—Case No. IPR2018-00003 (Oct. 6, 2017).

Ex 1003—Declaration of Michael Lebby, Ph.D., in Support of Petition for Inter Partes Review of U.S. Pat. No. 7,198,409 (Oct. 6, 2017).
Ex. 1004—JP 2000-241629A to Hirao et al. ("*Hirao*") with certified translation.
Ex. 1005—U.S. Pat. No. 6,554,485 ("*Beatty*").
Ex. 1006—"*SSC-PE Series Single-Mode SC Connector Plugs: Technical Specifications*," Seiko Instruments, Inc., copyright 2002 ("*Seiko Specification*").
Ex. 1008—"*JIS C 5973: F04 Type connectors for optical fiber cables*," Japanese Standards Association, 1998 ("*JIS C 5973 Standard*").
Ex. 1009—"*Senko Advanced Components: SC Connector Kits,*" printout from website of Senko Advanced Components at www.senko.com/fiberoptic/detail_product.php?product=80 available at least as early as Mar. 26, 2003 (obtained Oct. 5, 2017 via Internet Archive Wayback Machine) ("*Senko Data Sheet*".
Ex. 1010—"*Corning Cable Systems UniCam™ SC/ST-Compatible/FC Connector Assembly Instructions Using FBC-006 Cleaver*," Corning Cable Systems, Inc., May 2001 ("*Corning Data Sheet*").
Preliminary Response by Patent Owner Under 37 C.F.R. § 42.107, Paper No. 5, Case No. IPR2018-00003, 77 pages (Jan. 12, 2018).
Exhibit 2001 to Paper No. 5—Declaration of Casimer Decusatis in Support of Patent Owner's Preliminary Response, Case No. IPR2018-00003, 50 pages (Jan. 11, 2018).
Exhibit 2002 to Paper No. 5—True and correct information downloaded from website https://www.commscope.com/catalog/solution_wn_centralofc_hdfullfrontodf/2147496441/pdf/part/63205/CS6174-000_FIST-GR3-R-300_300-22-2.pdf on Jan. 5, 2018.
Exhibit 2003 to Paper No. 5—True and correct information downloaded from the website http://wbtnetworks.com.au/product/high-density-optical-distribution-frame-00-series/ on Jan. 5, 2018.
Exhibit 2004 to Paper No. 5—True and correct information downloaded from the website https://www.seeclearfield.com/products/categoiy/frames/fxhd-frames.html on Jan. 5, 2018.
Exhibit 2005 to Paper No. 5—True and correct information downloaded from the website http://www.lxtelecom.com/fiber-optics/optical-fiber-distribution-frames/hd-odf-gpx82-5.html on Jan. 5, 2018.
Petition for Inter Partes Review of U.S. Pat. No. 7,809,233—Case No. IPR2018-00154 (Nov. 7, 2017).
Exhibit 1001 to IPR IPR2018-00154—U.S. Pat. No. 7,809,233 ("the '233 Patent").
Exhibit 1002 to IPR IPR2018-00154—Prosecution History of the '233 Patent ("the Prosecution History").
Exhibit 1003 to IPR IPR2018-00154—Declaration of Dr. Michael Lebby.
Exhibit 1004 to IPR IPR2018-00154—JP 2000-193833A to Oda et al. ("Oda") with certified translation.
Exhibit 1005 to IPR IPR2018-00154—JP 2000-241629A to Hirao et al. ("Hirao") with certified translation.
Exhibit 1006 to IPR IPR2018-00154—U.S. Pat. No. 6,983,095 to Reagan et al. ("Reagan").
Exhibit 1007 to IPR IPR2018-00154—U.S. Pat. No. 6,256,443 to Uruno et al. ("Uruno").
Exhibit 1008 to IPR IPR2018-00154—Excerpt from CommScope's Initial Claim Charts (Exhibit C) served Jul. 31, 2017, in *CommScope Technologies LLC v. Clearfield, Inc.*,Case No. 0:12-cv-00307-PJS-BRT (D. Minn.).
Exhibit 1009 to IPR IPR2018-00154—"SSC-PE Series Single-Mode SC Connector Plugs: Technical Specifications," Seiko Instruments, Inc., copyright 2002 ("Seiko Specification").
Exhibit 1010 to IPR IPR2018-00154—"JIS C 5973: F04 Type connectors for optical fiber cables," Japanese Standards Association, 1998 ("JIS C 5973 Standard").
Exhibit 1011 to IPR IPR2018-00154—"Senko Advanced Components: SC Connector Kits," printout from website of Senko Advanced Components at www.senko.com/fiberoptic/detail_product.php?product=80 available at least as early as Mar. 26, 2003 (obtained Oct. 5, 2017 via Internet Archive Wayback Machine) ("Senko Data Sheet").

(56) References Cited

OTHER PUBLICATIONS

Exhibit 1012 to IPR IPR2018-00154—"Corning Cable Systems UniCam™ SC/ST-Compatible/FC Connector Assembly Instructions Using FBC-006 Cleaver," Corning Cable Systems, Inc., May 2001 ("Corning Data Sheet").
Preliminary Response by Patent Owner Under 37 C.F.R. § 42.107, Case No. IPR2018-00154, 60 pages (Feb. 16, 2018).
Exhibit 2001—Declaration of Casimer DeCusatis in Support of Patent Owner's Preliminary Response, Case No. PR2018-00154, 39 pages (Feb. 13, 2018).
Exhibit 2002—Declaration of Michael Lebby, Ph.D., in Support of Petition for Inter Partes Review of U.S. Pat. No. 8,705,929 (Ex. 1003 in *Clearfield, Inc.* v. *CommScope Technologies LLC*, IPR2017-02122), Case No. PR2018-00154, 141 pages (Feb. 16, 2018).
Exhibit 2003—Exhibit 10 to Clearfield Inc's Second Revised Preliminary Invalidity Claim Charts and Disclosures, served on Jan. 12, 2018, Case No. PR2018-00154, 43 pages (Feb. 16, 2018).
European Office Action for Application No. 10181631.2 dated Apr. 29, 2019.

\* cited by examiner

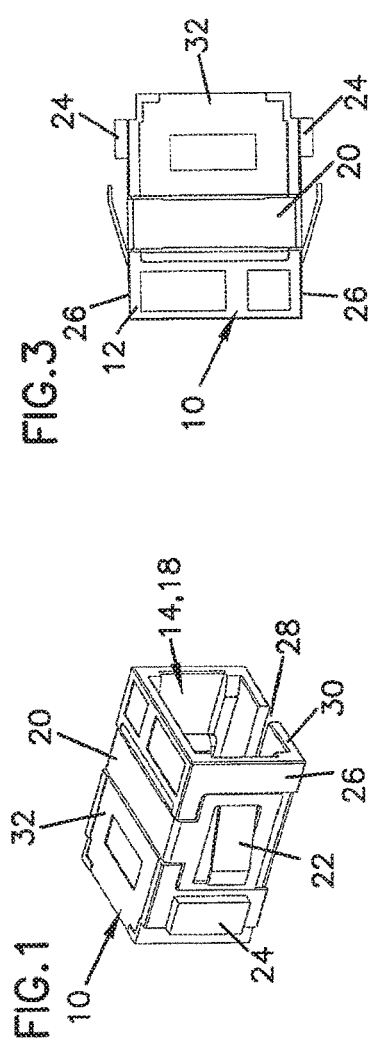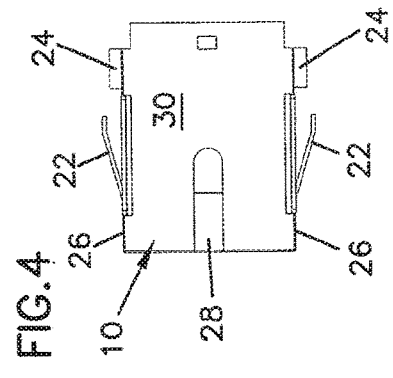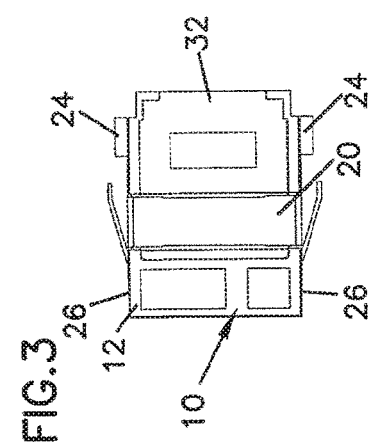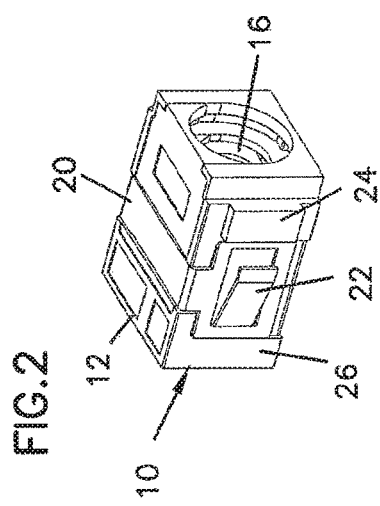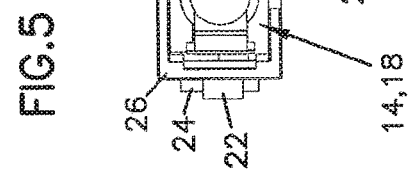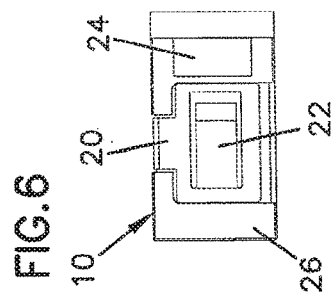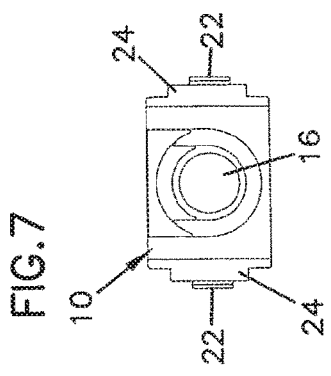

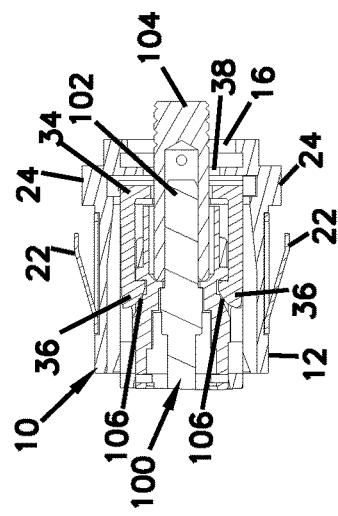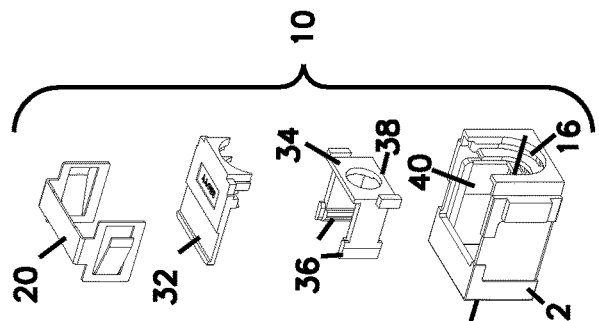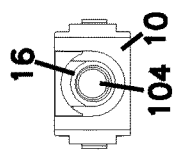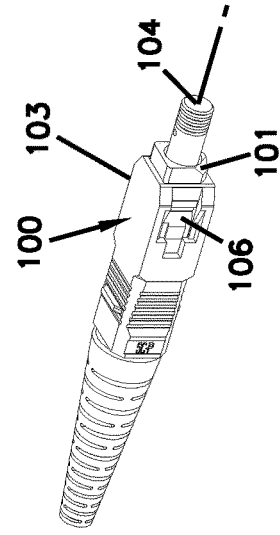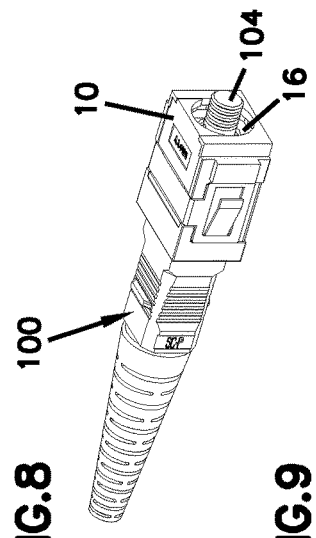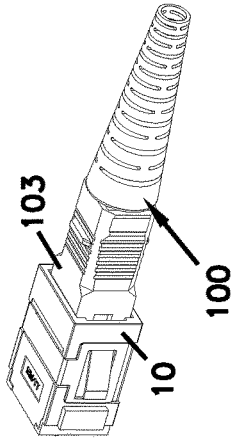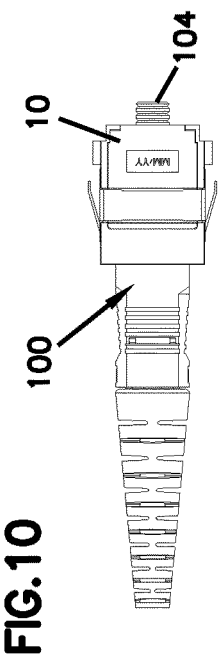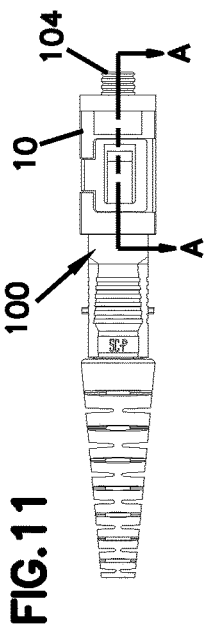

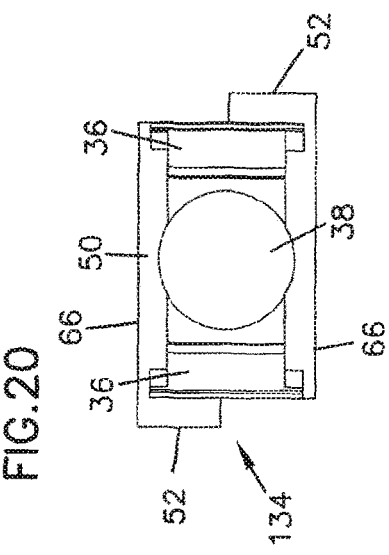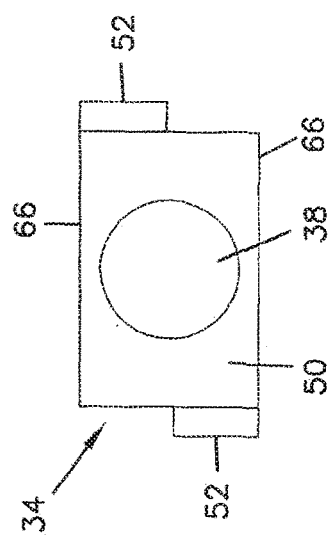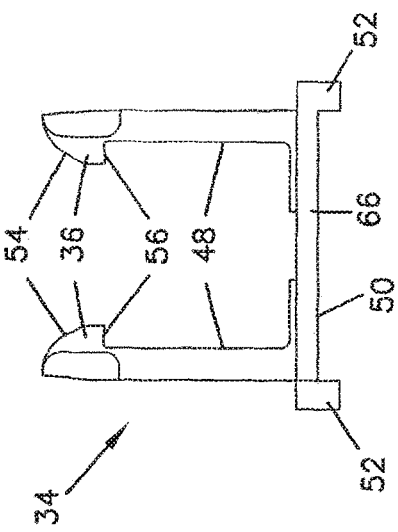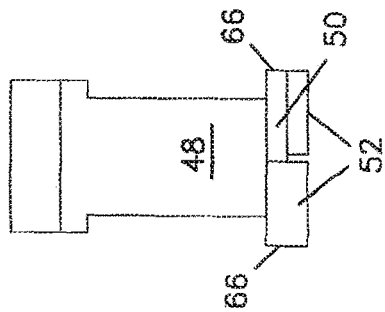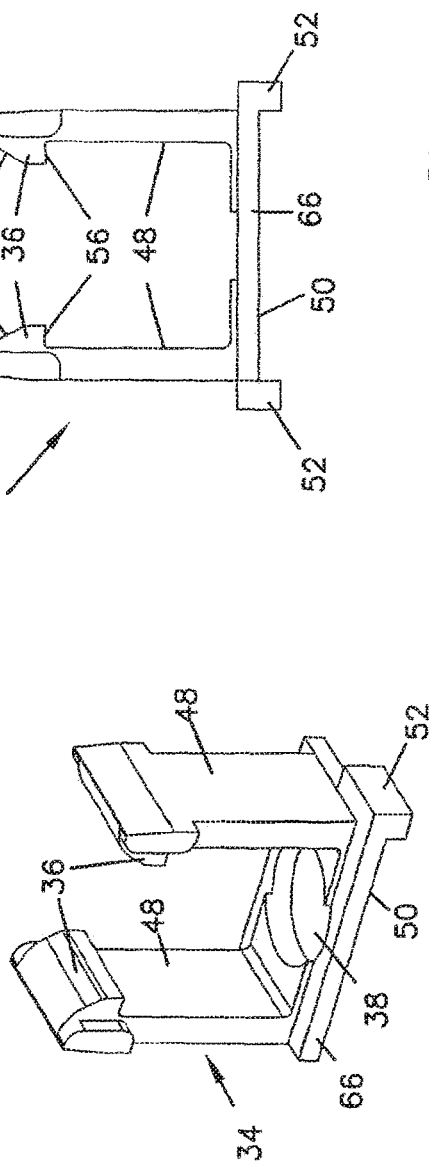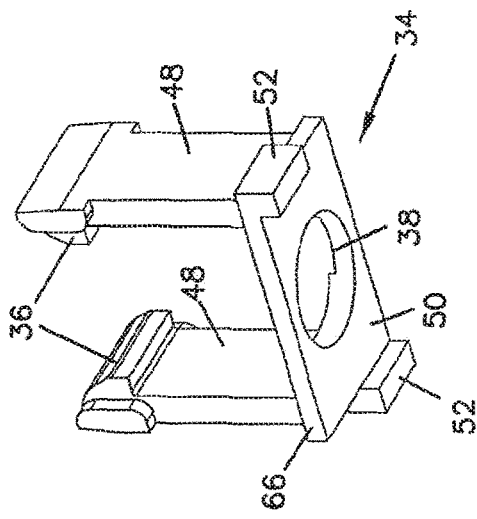

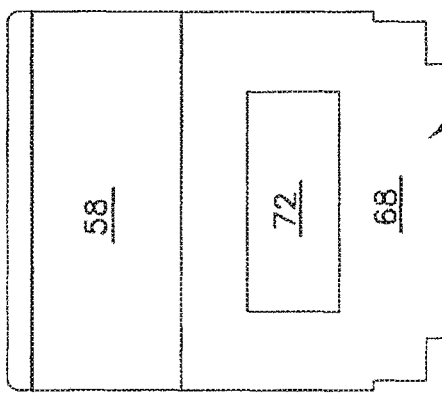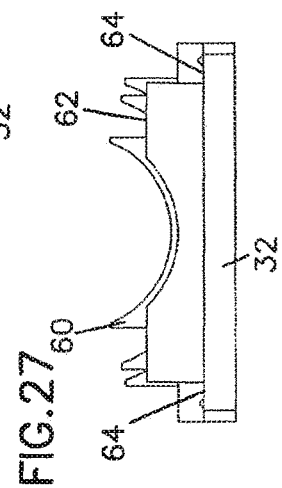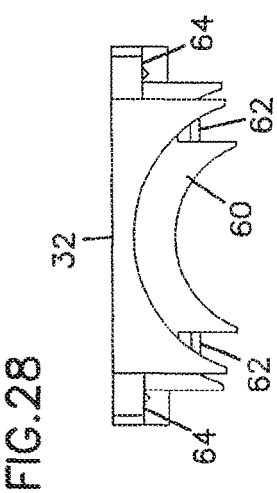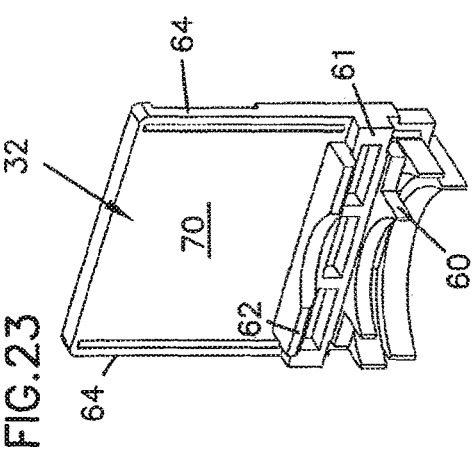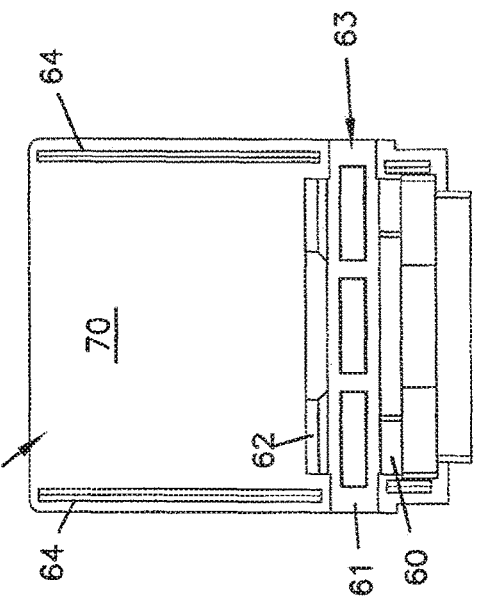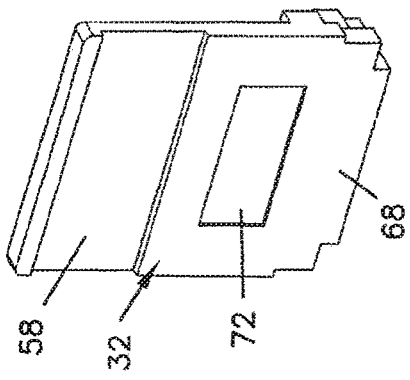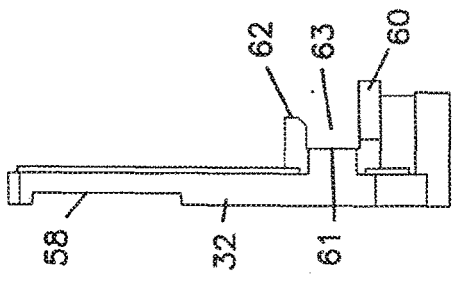

FIBER OPTIC CONNECTOR HOLDER AND METHOD

CROSS REFERENCE TO RELATED APPLICATIONS

This application is a continuation of application Ser. No. 15/728,067, filed Oct. 9, 2017, now U.S. Pat. No. 10,168,491, which is a continuation of application Ser. No. 15/289,330, filed Oct. 10, 2016, now U.S. Pat. No. 9,784,928, which is a continuation of application Ser. No. 14/840,986, filed Aug. 31, 2015, now U.S. Pat. No. 9,470,851, which is a continuation of application Ser. No. 14/132,282, filed Dec. 18, 2013, now U.S. Pat. No. 9,122,019, which is a continuation of application Ser. No. 13/540,258, filed Jul. 2, 2012, now U.S. Pat. No. 8,636,421, which is a continuation of application Ser. No. 13/177,108, filed Jul. 6, 2011, now U.S. Pat. No. 8,210,756, which is a continuation of application Ser. No. 12/908,271, filed Oct. 20, 2010, now U.S. Pat. No. 7,980,768 which is a continuation of application Ser. No. 12/185,504, filed Aug. 4, 2008, now U.S. Pat. No. 7,841,775, which is a continuation of application Ser. No. 11/729,425, filed Mar. 27, 2007, now U.S. Pat. No. 7,407,330, which is a continuation of application Ser. No. 10/610,325, filed Jun. 30, 2003, now U.S. Pat. No. 7,198,409, which applications are incorporated herein by reference in their entirety.

TECHNICAL FIELD

The present invention generally relates to holders for fiber optic connectors and more specifically relates to holders for fiber optic connectors which are protected by dust caps.

BACKGROUND

Fiber optic connectors include a polished end face, typically held by a ferrule, which permits positioning of the optical fiber held by the connector to receive and transmit signals another optical fiber or optical light source. It is desirable to keep these polished end faces as free of contaminants as possible to improve the transmission of light to and from the optical fiber held by the connector. Such contaminants which might adversely impact the transmission of light to and from the optical fiber include but are not limited to dust and finger prints.

Dust caps may be provided for connectors to protect the polished end face of the optical fiber. However, when such dust caps are in place, the connector is not capable of being received in known optical fiber adapters, such as those described in U.S. Pat. Nos. 5,317,663, and 6,347,888. The disclosures of these patents are incorporated herein by reference. A connector may be inserted into one of these known adapters for storage or pre-wiring of a cross-connection point, an interconnection point or some other type telecommunications switching or connection equipment with the dust cap removed. While the adapters might provide some protection from contaminants to a single connector inserted into an adapter, these adapters are not as effective as a dust cap in protecting the polished end face.

It is desirable to improve the known methods and apparatus for protecting the polished end face of a fiber optic connector within telecommunications equipment.

SUMMARY

The present invention relates to a fiber optic connector holder sized to fit within an opening for mounting a fiber optic adapter. The fiber optic connector holder is configured to permit a fiber optic connector with a dust cap positioned about a ferrule and a polished end face of an optical fiber held by the ferrule to be inserted within and releasably held by the connector holder.

The present invention further relates to a system for holding fiber optic connectors including a fiber optic connector holder mounted within an opening in a bulkhead for mounting a fiber optic adapter. The fiber optic connector holder is configured to receive a fiber optic connector with a dust cap mounted about a ferrule and polished end face of an optical fiber held by the ferrule. The connector holder may be removed from the bulkhead and a fiber optic adapter may be mounted within the same opening.

The present invention also relates to a method of holding an optical fiber connector to a bulkhead, when the fiber optic connector includes a dust cap mounted about a ferrule and a polished end face of an optical fiber held by the ferrule.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 1 is a first perspective view of a fiber optic connector holder according to the present invention.

FIG. 2 is a second perspective view of the fiber optic connector holder of FIG. 1.

FIG. 3 is a top view of the fiber optic connector holder of FIG. 1.

FIG. 4 is a bottom view of the fiber optic connector holder of FIG. 1.

FIG. 5 is a first end view of the fiber optic connector holder of FIG. 1.

FIG. 6 is a side view of the fiber optic connector holder of FIG. 1.

FIG. 7 is a second opposite end view of the fiber optic connector holder of FIG. 1.

FIG. 8 is a first perspective view of system for holder a fiber optic connector including the fiber optic connector holder of FIG. 1 with a fiber optic connector inserted.

FIG. 9 is a second perspective view of the system for holding a fiber optic connector of FIG. 8.

FIG. 10 is a top view of the system for holding a fiber optic connector of FIG. 8.

FIG. 11 is a side view of the system for holding a fiber optic connector of FIG. 8.

FIG. 12 is an end view of the system for holding a fiber optic connector of FIG. 8.

FIG. 13 is a cross-sectional view of the system for holding a fiber optic connector of FIG. 8, taken along line A-A in FIG. 11.

FIG. 14 is an exploded perspective view of the system for holding a fiber optic connector of FIG. 8.

FIG. 16 is a first perspective view of an inner housing of the fiber optic connector holder of FIG. 1.

FIG. 17 is a second perspective view of the inner housing of FIG. 16.

FIG. 18 is a top view of the inner housing of FIG. 16.

FIG. 19 is a side view of the inner housing of FIG. 16.

FIG. 20 is a first end view of the inner housing of FIG. 16.

FIG. 21 is a second end view of the inner housing of FIG. 16.

FIG. 22 is a first perspective view of the cover of the fiber optic connector holder of FIG. 1.

FIG. 23 is a second perspective view of the cover of FIG. 22.

FIG. 24 is a top view of the cover of FIG. 22.

FIG. 25 is a side view of the cover of FIG. 22.

FIG. 26 is a bottom view of the cover of FIG. 22.

FIG. 27 is a first end view of the cover of FIG. 22.

FIG. 28 is a second end view of the cover of FIG. 22.

DETAILED DESCRIPTION

Figure 15:
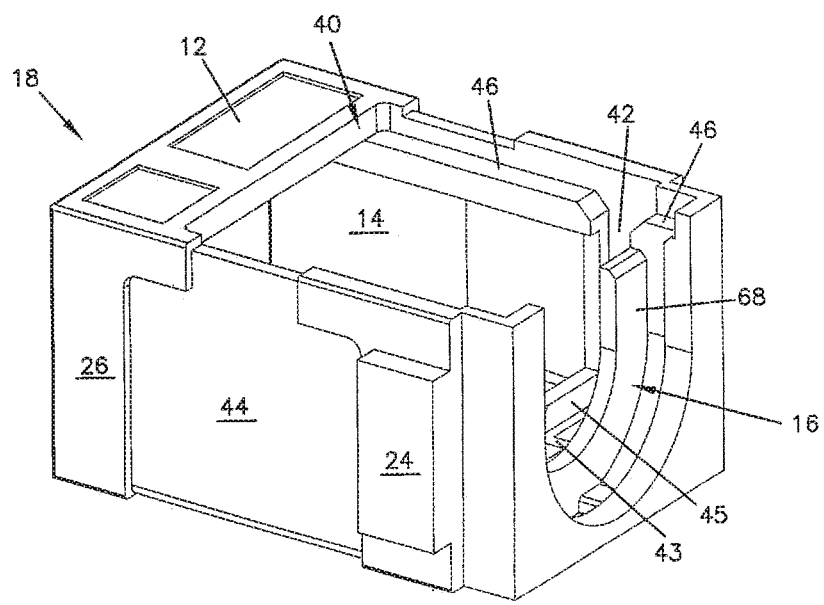
FIG. 15 is a perspective view of the main housing of the fiber optic connector holder of FIG. 1.
Figure 30:
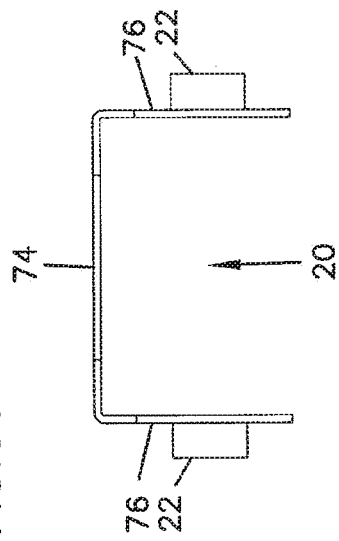
FIG. 30 is an end view of the clip of FIG. 29.
Figure 32:
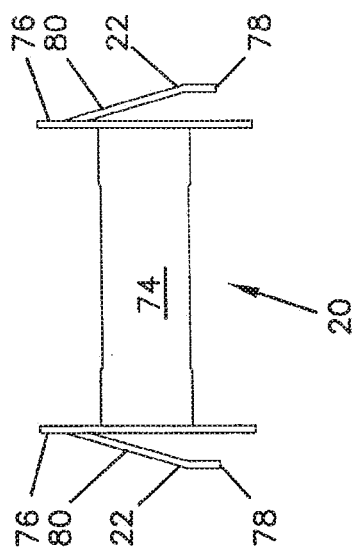
FIG. 32 is a bottom view of the clip of FIG. 29.
Figure 29:
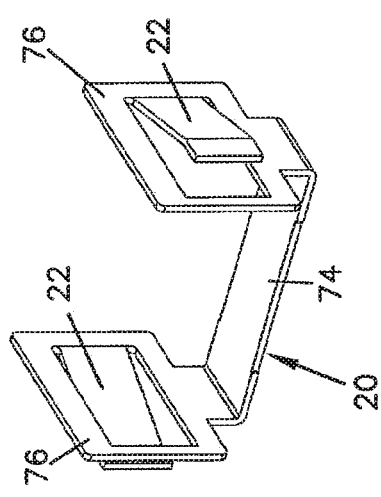
FIG. 29 is a perspective view of the clip of the fiber optic connector holder of FIG. 1.
Figure 31:
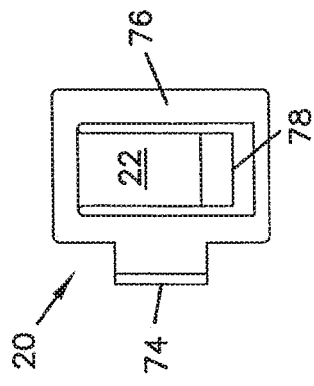
FIG. 31 is a side view of the clip of FIG. 29.

Reference will now be made in detail to exemplary aspects of the present invention which are illustrated in the accompanying drawings. Wherever possible, the same reference numbers will be used throughout the drawings to refer to the same or similar parts.

Fiber optic cables may be terminated with fiber optic connectors such as connector 100 shown in FIGS. 8 through 14, below. Optical fiber within these cables may be terminated at a polished end face held by a ferrule 102 in connector 100, as is well known in the art and shown in U.S. Pat. No. 5,317,663, incorporated herein by reference. These polished end faces and ferrules 102 need to be stored and protected until needed for connecting to other fiber optic cables or optical signal equipment. The fiber optic connector 100 including a connector body 101 surrounding the ferrule 102 and a connector sleeve 103 mounted over the connector body 101 (e.g., see FIG. 14).

Often a dust cap 104 may be placed about ferrule 102 and the polished end face of the optical fiber to protect the polished end face from contamination from dust, fingerprints or other items which might degrade optical signal transmission. While it is known to store these in known optical fiber adapters until the fiber within the attached cable is needed to connect to another fiber optic cable or optical signal equipment, such storage is less than ideal as adapters do not seal the polished end face from contamination as well as dust cap 104 securely fit and held about ferrule 102 of connector 100. Known adapters do not permit insertion of connector 100 which still has dust cap 104 in place about ferrule 102 and the polished end face of the cable.

Referring now to FIGS. 1 and 2, connector holder 10 includes a main housing 12 defining an interior cavity 14. An open end 18 permits insertion of a connector 100 into cavity 14 while an opposite opening 16 permits dust cap 104 to protrude from connector holder 10. A clip 20 is positioned about main housing 12 and includes a pair of spring mounting clips 22. A pair of flanges 24 extends from opposing sides 26 of main housing 12 adjacent spring clips 22. Clips 22 and flanges 24 cooperate to releasably mount holder 10 to an opening in a bulkhead as is shown below.

Main housing 12 also includes a bottom 30 with a keyway 28 to receive a keyed extension of connector 100 to consistently orient connector 100 for insertion into cavity 14. Opposite bottom 30 is an open top closed a cover 32. This is shown in more detail in FIG. 12, below. FIGS. 3 through 7 provide additional views of connector holder 10.

Referring now to FIGS. 8 through 13, connector holder 10 is shown with connector 100 positioned within cavity 18. Dust cap 104 extends from opening 16 of connector holder 10 while connector 100 is inserted through open end 14. The fiber optic connector 100 is stored in the connector holder 10 with a first portion of the connector sleeve 103 positioned within the interior cavity 14 and a second portion of the connector sleeve 103 projecting outwardly from the front of the connector holder 10 (e.g., see FIG. 9).

Referring now to FIGS. 13 and 14, connector holder 10 further includes an inner housing 34 with a pair of opposing releasable catches 36 and an opening 38 sized to receive dust cap 104. Inner housing 34 is positioned within main housing 12 through an open top 40 with opening 38 adjacent opening 16 and catches 36 adjacent open end 14. Cover 32 is then positioned within open top 40 and clip 20 placed about cover 32 and main housing 12. Cover 32 may be sealed within open top 40 by gluing, ultrasonic welding or a variety of known fastening techniques. Connector 100 includes a pair of opposing recesses 106 which receive catches 36 when connector 100 is inserted within holder 10.

As shown, connector 100 and holder 10 are FC style. Connector 100 and holder 10 may conform to other styles and formats of electrical connectors and adapters without straying from the spirit of the present invention.

Referring now to FIG. 15, main housing 12 also includes a slot 42 along both sides of cavity 14 to receiving and positioning a flange of inner housing 34 within cavity 14. A recess 44 is provided along sides 26 to receive clip 20. Open top 40 includes a ledge 46 upon which cover 32 is positioned to close cavity 14. An outer bulkhead 68 forms a portion of opening 16. An inner bulkhead 45 is positioned spaced apart from outer bulkhead 68 and these bulkheads cooperate to define slot 42. Between bulkheads 45 and 68 is a positioning surface 43 defining the bottom of slot 42.

Referring now to FIGS. 16 to 21, inner housing 34 includes a pair of clip arms 48 extending from a cross piece 50. Opening 38 for receiving dust cap 104 of connector 100 is in cross piece 50. Catches 36 are at the end of clip arms 48 opposite cross piece 50. Cross piece 50 includes a pair of flanges 52 which are received in slots 42 in main housing 12. As shown in FIG. 18, catches 36 include a ramped portion 54 which is engaged by connector 100 as connector 100 is inserted within cavity 14 through open end 18 of connector holder 10. Clip arms 48 are deflected outward allowing connector 100 to pass between catches 36. When connector 100 is fully inserted within cavity 14 (as shown in FIG. 13) catches 36 are received within recesses 106 and a retaining surface 56 of each catch 36 hold connector 100 within cavity 14.

Inner housing 34 is configured to permit insertion within slots 42 of cavity 14 of main housing 12 in either of two orientations. A pair of edges 66 of cross piece 50 properly position inner housing within cavity 14 with regard to cover 32 and main housing 12 so that opening 38 is aligned to receive dust cap 104.

Referring now to FIGS. 22 to 28, cover 32 includes a recess 58 for receiving clip 20 along an outer surface 68. Also in outer surface 68 is a recess 72 for receiving indicia.

Along an inner surface 70 are formed a pair of edges 64 configured to be received upon ledges 46 of main housing 12. Extending from inner surface 70 is an outer flange 60 which cooperates with bulkhead 68 within main housing 12 to define opening 16. Also extending from inner surface 70 is a inner flange 62 which is spaced apart from outer flange 60 to form a slot 63. Slot 63 cooperates within slot 42 of main housing 12 to receive flanges 52 of inner housing 34.

At the top of slot 63 is a positioning surface 61 which cooperates with one of edges 66 of inner housing 34 to position inner housing 34 within cavity 14 so that opening 38 of inner housing 34 is aligned with opening 16. When assembled as connector holder 10, positioning surface 43 of main housing 12 and positioning surface 61 of cover 32 cooperate to engage both edges 66 of inner housing 34. Slot 42 of main housing 12 and slot 63 of cover 32 cooperate to capture flanges 52 of inner housing 34.

Referring now to FIGS. 29 to 32, clip 20 includes a cross piece 74 and a pair of opposing sides 76. Spring clips 22 are formed in sides 76. Sides 76 are received within recesses 44 of main housing 12 and cross piece 74 is received within recess 58 of cover 32. It is anticipated that clip 20 will be made of a resilient deformable metal to facilitate insertion and removal from an opening in a bulkhead. Spring clips 22 each include an end 78 and a ramped surface 80.

Figure 34:
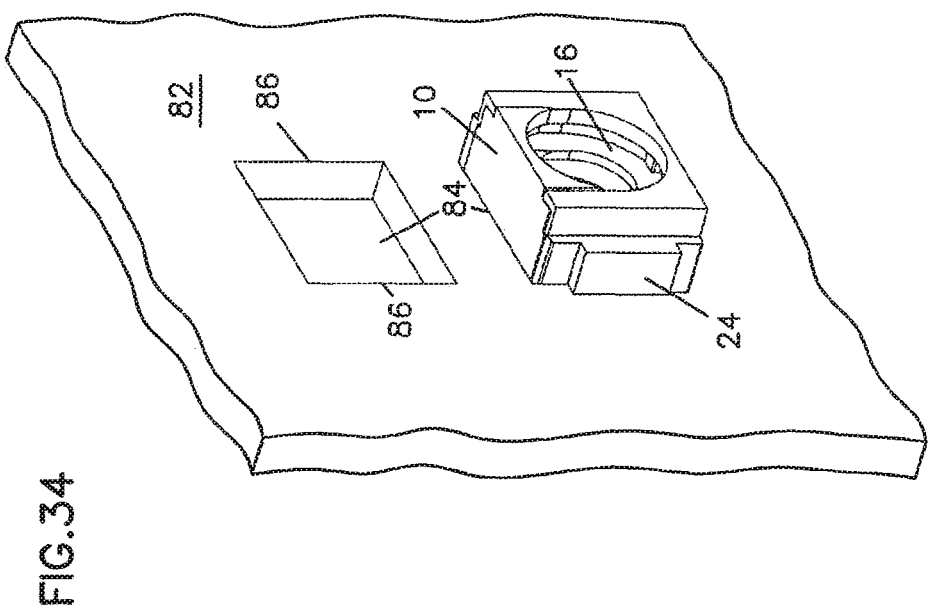
FIG. 34 is a perspective view of a bulkhead including a plurality of openings for receiving fiber optic connector adapters and the fiber optic connector holder of FIG. 1 inserted within one of the openings.
Figure 33:
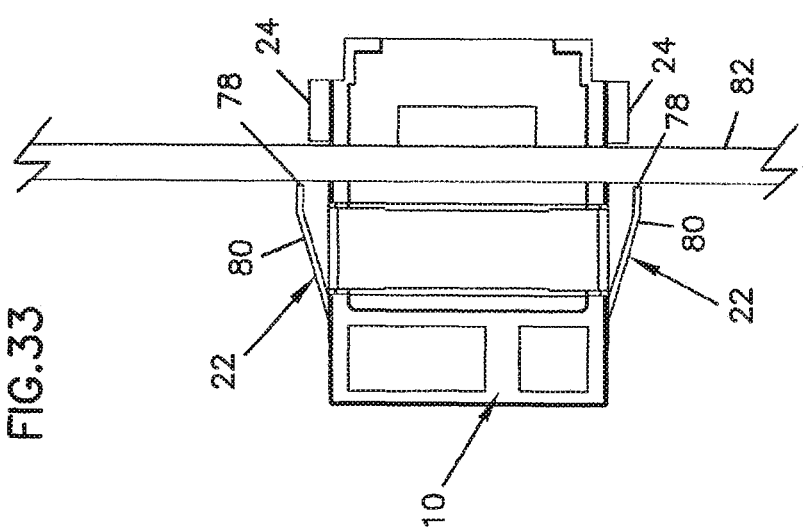
FIG. 33 is a top view of the fiber optic connector holder of FIG. 1 inserted within an opening in a bulkhead.
Figure 38:
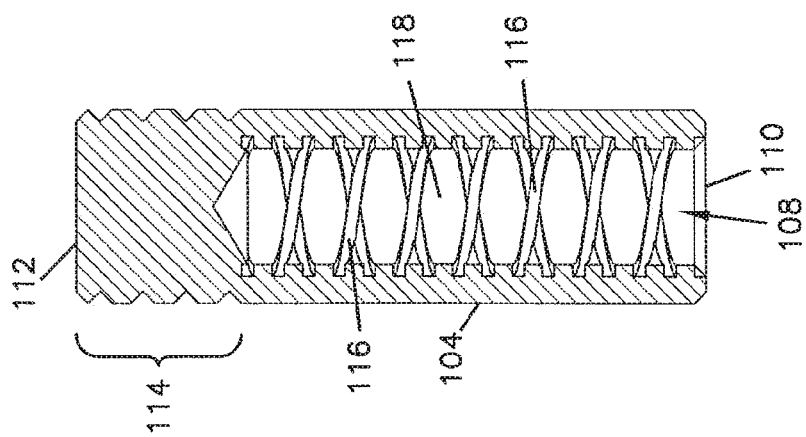
FIG. 38 is a cross-sectional view of the dust cap of FIG. 35.
Figure 37:
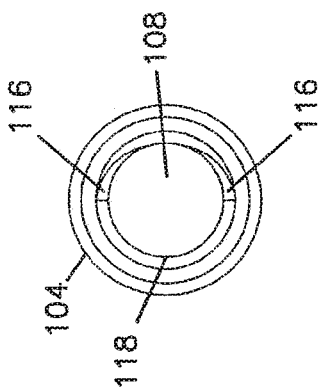
FIG. 37 is an end view of the dust cap of FIG. 35.
Figure 36:
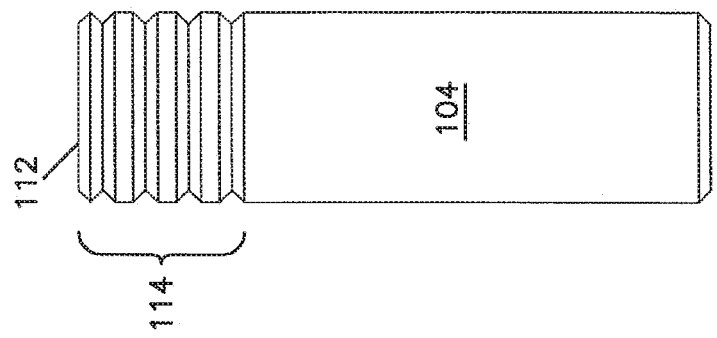
FIG. 36 is a side view of the dust cap of FIG. 35.
Figure 35:
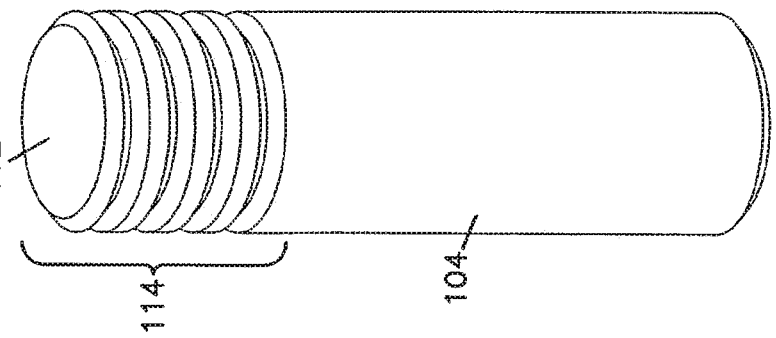
FIG. 35 is a perspective view of the dust cap of the fiber optic connector of FIG. 14.

FIGS. 33 and 34 shows fiber optic connector holder 10 inserted within an opening 84 in a bulkhead 82. Bulkhead 82 may be part of a piece of telecommunications switching equipment such as a panel for making a plurality of connections between optical fiber cables including a plurality of openings 84 for adapters, as shown in FIG. 34. Alternatively, bulkhead 82 may include only a single opening 84 where only a single fiber optic connector holder 10 is needed.

Open end 18 of connector holder 10 is inserted through opening 84 until a pair of sides 86 of opening 84 engage ramped surfaces 80 of spring clips 22. Continued insertion of connector holder 10 will cause bulkhead sides 86 to deflect spring clips 22 inward toward sides 26. Bulkhead sides 86 will eventually pass beyond ends 78 of spring clips 22. Spring clips 22 will then spring back as shown in FIG. 34, capturing bulkhead sides 86 between ends 78 and flanges 24. Connector holder 10 may be removed from opening 84 by compressing spring clips 22 and removing in a direction opposite the insertion described above.

Alternatively, flanges 24 may be configured to include a fastener opening so that connector holder 10 can be mounted within opening 84 by removable fasteners.

It is anticipated that bulkhead should be interpreted broadly enough to include a telecommunications installation where openings 84 for mounting adapters and connector holders are included into sliding adapter packs, such as described in commonly-owned U.S. Pat. No. 5,497,444. The disclosure of this patent is incorporated herein by reference. Bulkhead should also be interpreted broadly enough to include a single opening in a wall or panel, a face plate of a telecommunications module for cross-connecting or interconnecting multiple optical fiber cables, as well as other telecommunications installations where one or more adapters may be mounted within an opening 84.

Referring now to FIGS. 35 through 38, dust cap 104 includes a central opening 108 to receive ferrule 102 when ferrule 102 is inserted through open end 110. Opposite open end 110 is closed end 112 which includes knurling 114 to provide better grip for removing dust cap 104. Central opening 108 fits about ferrule 102 to provide a seal about ferrule 102 and to hold dust cap to connector 100. Due to the reduction of air volume within central opening 108 when ferrule 102 is inserted (see FIG. 13), one or more helix shaped recesses 116 are provided within central opening 108 along inner walls 118. Recesses 116 extend from adjacent closed end 112 to open end 110. Recesses 116 are small enough prevent entry of unwanted contaminants and still permit air displaced within central opening 108 to be expelled when ferrule 102 is inserted so that dust cap 104 may be fully seat to connector 100. Recesses 116 also allow air to pass into central opening 108 when dust cap 104 is withdrawn from ferrule 102. The shape of each recess 116 is also designed to allow passage of air into and out of central opening 108 when dust cap 104 is removed or placed on ferrule 102 while inhibiting the passage of contaminants along the same path.

The above specification, examples and data provide a complete description of the manufacture and use of the composition of the invention. Since many embodiments of the invention can be made without departing from the spirit and scope of the invention, the invention resides in the claims hereinafter appended.

What is claimed is as follows:

1. A fiber optic assembly comprising:
   a fiber optic connector including a ferrule holding a polished end face of an optical fiber;
   a dust cap placed about the ferrule to protect the polished end face of the optical fiber; and
   a connector holder defining an interior cavity accessible to the fiber optic connector through a first opening of the connector holder, the connector holder also defining an opposite second opening through which the dust cap protrudes while the fiber optic connector is inserted through the first opening, the connector holder also including a catch within the interior cavity to retain the fiber optic connector at the connector holder, wherein the dust cap passes through the first opening before passing through the second opening when the fiber optic connector is received at the connector holder.

2. The fiber optic assembly of claim 1, wherein the catch is a releasable catch.

3. The fiber optic assembly of claim 1, wherein the catch includes a ramped portion disposed at a distal end of a deflectable clip arm.

4. The fiber optic assembly of claim 1, wherein the catch is one of a pair of resilient catches.

5. The fiber optic assembly of claim 1, wherein the connector holder includes a resilient, deformable construction at an exterior of the connector holder.

6. The fiber optic assembly of claim 5, wherein the resilient, deformable construction includes a spring clip.

7. The fiber optic assembly of claim 1, wherein the connector holder is sized to receive a single fiber optic connector.

8. The fiber optic assembly of claim 1, wherein the fiber optic connector includes a boot at an opposite end of the fiber optic connector from the dust cap, the boot being completely outside the interior cavity when the fiber optic connector is stored at the connector holder.

9. The fiber optic assembly of claim 1, wherein the second opening is smaller than the first opening.

10. The fiber optic assembly of claim 1, wherein the second opening has a round shape.

11. A fiber optic assembly comprising:
    a plurality of fiber optic connectors, each fiber optic connector including a ferrule supporting an optical fiber that defines an end face, each ferrule receiving a respective dust cap fit and held about the ferrule to protect the end face of the respective optical fiber;

a bulkhead; and a plurality of connector holders disposed at the bulkhead, each connector holder extending along a length between a front and a rear, each connector holder defining an interior accessible through a first aperture defined at the respective front of the connector holder, the rear of each connector holder defining a respective second aperture that is aligned with the respective first aperture, each connector holder also including a catch to retain a respective one of the fiber optic connectors at the connector holder, wherein when the respective fiber optic connector is received at each connector holder through the first aperture a portion of the respective dust cap protrudes through the second aperture.

12. The fiber optic assembly of claim 11, wherein the bulkhead defines a plurality of openings, each opening sized to receive one of the connector holders.

13. The fiber optic assembly of claim 12, wherein the fiber optic connectors extend through the openings so that at least the portions of the dust caps are disposed at one side of the bulkhead and another portion of each fiber optic connector is disposed at an opposite side of the bulkhead.

14. The fiber optic assembly of claim 12, wherein each fiber optic connector extends along a connector axis, and wherein the connector axes extend through the openings when the fiber optic connectors are received at the connector holders.

15. The fiber optic assembly of claim 14, wherein the connector axes are horizontal when the fiber optic connectors are received at the connector holders.

16. The fiber optic assembly of claim 11, wherein the connector holders extend through the bulkhead so that each first aperture is disposed at a first side of the bulkhead and each second aperture is disposed at an opposite second side of the bulkhead.

17. The fiber optic assembly of claim 11, wherein each connector holder includes a deflectable portion at an exterior of the connector holder.

18. The fiber optic assembly of claim 17, wherein the deflectable portions include spring clips.

19. The fiber optic assembly of claim 11, wherein each connector holder is sized to receive only one of the fiber optic connectors.

20. The fiber optic assembly of claim 11, wherein the second aperture is smaller than the first aperture.

* * * * *